(No Model.) 2 Sheets—Sheet 1.
G. W. GOODELL.
PROCESS OF AND APPARATUS FOR BLOCKING ICE.
No. 275,192. Patented Apr. 3, 1883.
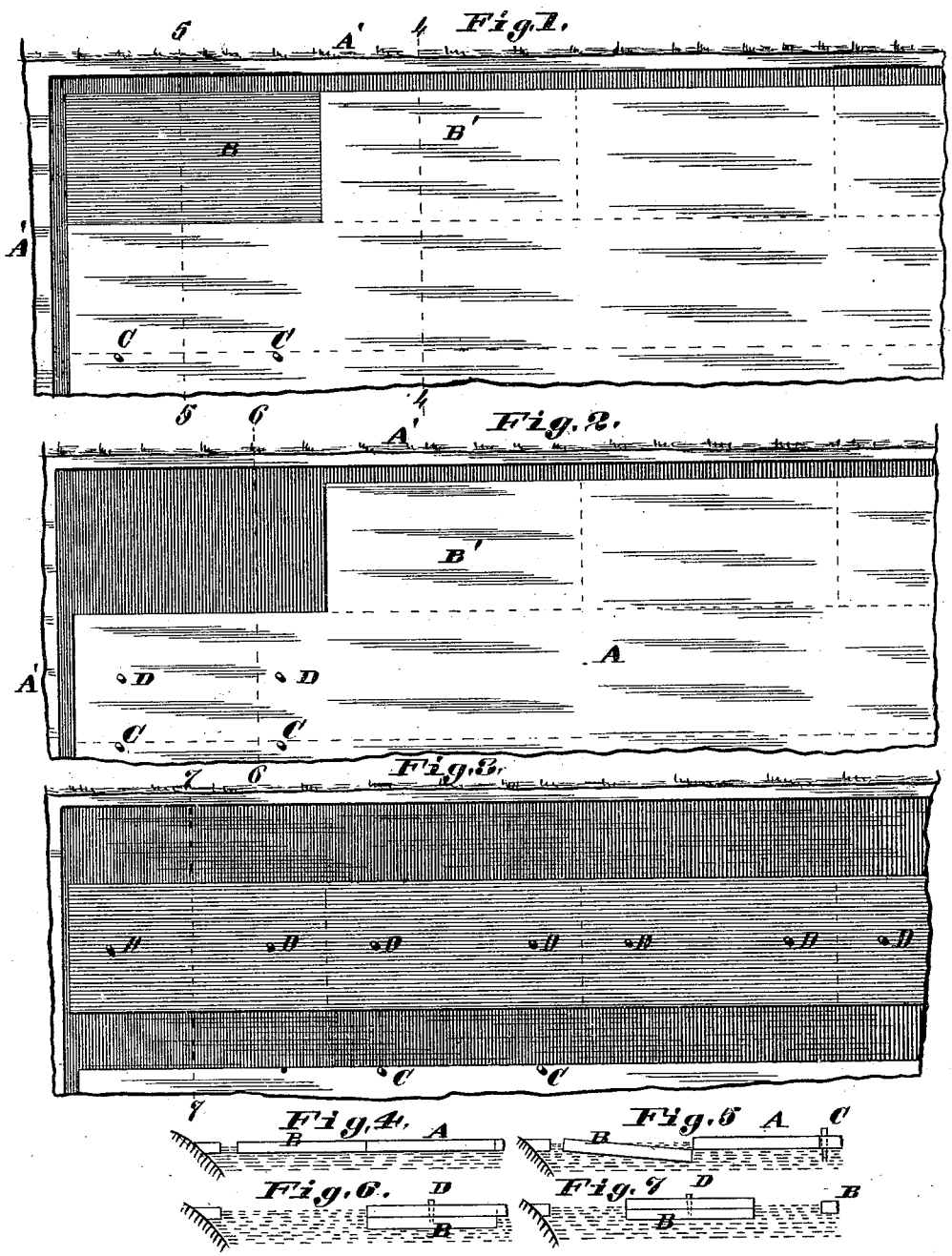

(No Model.) 2 Sheets—Sheet 2.
G. W. GOODELL.
PROCESS OF AND APPARATUS FOR BLOCKING ICE.
No. 275,192. Patented Apr. 3, 1883.
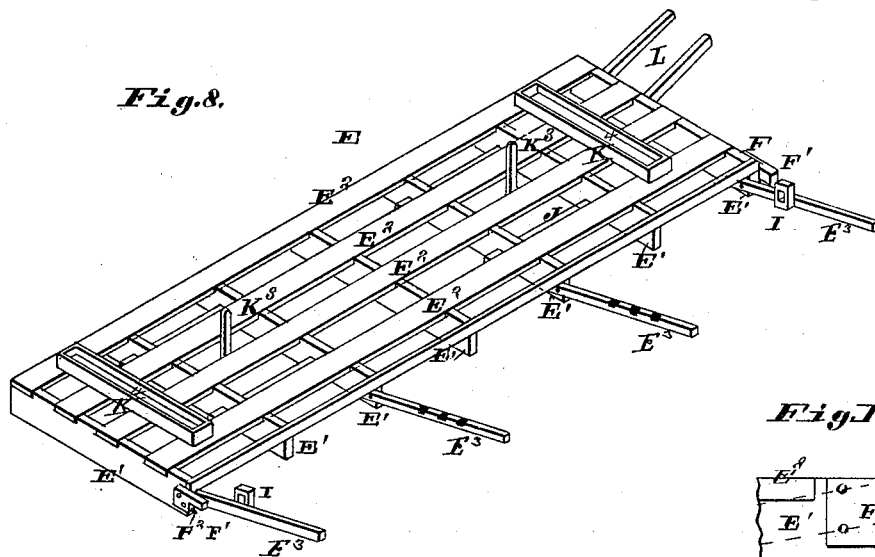
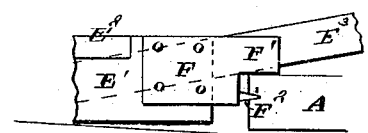
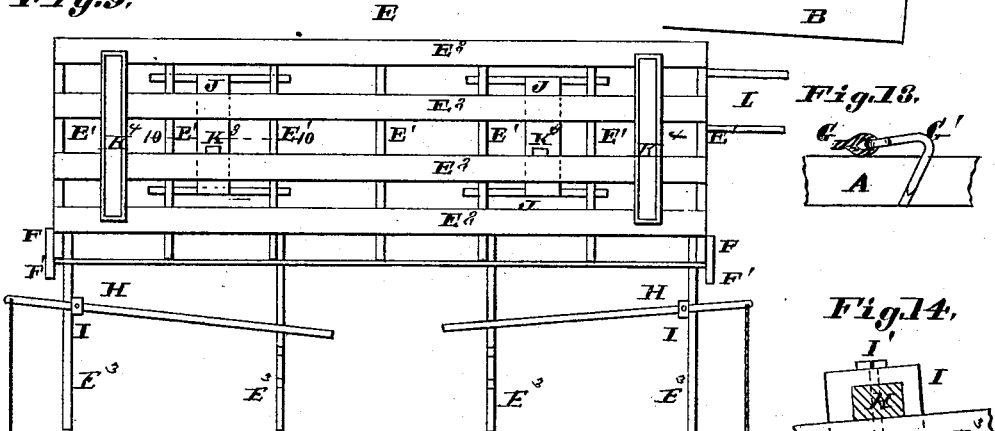
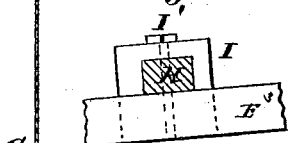
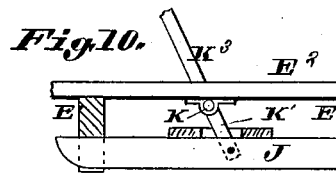
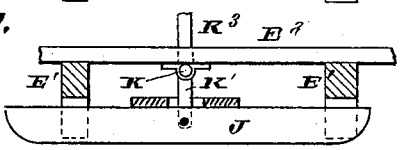
Attest:
Wm. F. Fayerd
H. Knight
Inventor:
Geo. W. Goodell
By Knight Bros
Attys.
N. PETERS. Photo-Lithographer, Washington, D. C.

UNITED STATES PATENT OFFICE.

GEORGE W. GOODELL, OF BEARDSTOWN, ILLINOIS.

PROCESS OF AND APPARATUS FOR BLOCKING ICE.

SPECIFICATION forming part of Letters Patent No. 275,192, dated April 3, 1883.

Application filed February 5, 1883. (No model.)

*To all whom it may concern:*

Be it known that I, GEORGE W. GOODELL, of Beardstown, in the county of Cass and State of Illinois, have invented a certain new and useful Improvement in Process of and Apparatus for Blocking Ice, of which the following is a full, clear, and exact description, reference being had to the accompanying drawings, forming part of this specification, and in which—

Figures 1, 2, 3, 4, 5, 6, and 7 illustrate the manner of carrying out the process; Fig. 8, a perspective view of the apparatus; Fig. 9, a top view of same; and Figs. 10, 11, 12, 13, 14, and 15, detail views illustrating the construction of the apparatus.

My invention relates, first, to a process of blocking ice when it is thin by putting one or more cakes together and allowing them to freeze in this condition, for the purpose of forming blocks of sufficient thickness for housing or putting up.

My invention relates, secondly, to an apparatus for thus blocking the ice.

Referring to the drawings, A represents a field of ice, and A' a space made by cutting out a "head-block" in the usual way.

B represents a cake of ice of convenient size, (say eleven by thirty-three feet,) which is cut from the main field. (See Fig. 1.) This block is then forced down and pushed sidewise beneath the field, being kept from moving inward too far by pins C, placed in holes bored in the field of ice eleven feet, or the width of the cake, back from the edge of the field. (See Fig. 2.) One or more holes are then bored through the field above the cake B, which extend down into the cake, into which pins D are inserted to hold the cake from moving in any direction, (see Figs. 2, 3, 6, and 7,) and then the pins C may be removed. Another cake, B', is then cut from the field and treated in the same way as cake B, the ends of the two fitting close together, and so on, any desired number of cakes being treated in this way, and then this double thickness of ice is cut off from the main field (see Figs. 3 and 7) and shifted over out of the way, and made fast by ropes or any suitable means. The lines of cut are shown by dotted lines, and it is evident that if desired a double cake of ice thus formed may be put under the field to make three thicknesses. When a tier of ice thus formed has stood a sufficient time for the parts to freeze together, it is cut up into blocks of the desired size for housing. The holes in which the pins C fit should not extend through the cakes of ice B, for the water will come up around them and freeze them fast. Figs. 4, 5, 6, and 7 show sections of the cakes taken, respectively, on lines 4, 5, 6, and 7, Figs. 1, 2, and 3.

By my improved process blocks of sufficient thickness for putting up may be made from very thin ice, so that in warm, and also in short, winters it is of great value.

E represents an apparatus for thus blocking cakes of ice. It consists of a number of runners, E', secured together by suitable cross-pieces, E², and having handle E³, as shown. The apparatus is first backed onto the cake of ice B, and then one or more persons get thereon, and with suitable instruments, assisted by their weight, compress or force down the forward edge of the cake, as shown in Fig. 5, and the next operation is to draw the sleigh or apparatus forward until projections F' of blocks F, secured to the outer runners, rest upon or are over the edge of the field of ice, and prongs or spikes F², secured in the blocks below the projections, engage with the vertical edge of the field of ice. (See Fig. 12.) The projections F' prevent any danger of the apparatus sinking under the weight of the parties on it when the cake of ice has been moved from beneath it, and the prongs prevent any end movement of the apparatus as the parties move about working the cake of ice to its place. The apparatus is thus pulled forward and held in this position by ropes G, anchored or secured to the field of ice by suitable hooks, G', entering holes bored to receive them, which are connected by their other ends to the outer ends of levers H, fulcrumed to the outer handles of the apparatus, the free ends of the levers engaging with notches in the inner handles, as shown, to hold them to their adjustment. Thus it will be seen that the front end of the apparatus can be jammed up and held tight against the edge of the field of ice. I have shown the levers pivoted or fulcrumed to the apparatus by passing through holes of blocks I, secured to the outer handles and held therein by vertical bolts I'. (See Fig. 14.) When the apparatus has thus been made fast, the cake of ice is worked from beneath it to its place against the pins C, as described. The parties then step off the apparatus, which is then disengaged from the field of ice by disengaging the free ends of the levers from the notches of the inner handles and then unhooking the ropes. The apparatus is then pulled onto the field of ice and backed onto another cake, which is treated in the same way, and so on.

In order that the apparatus can be moved endwise after being drawn from the water, so as to be in position for backing onto the next cake, I have supplied it with supplemental runners J at right angles to the main runners, which can be drawn up out of contact with the ice, or lowered so as to raise the main runners from the ice. I have shown these runners J hung beneath and to the cross-pieces $E^2$ by rock-shafts K, journaled in suitable boxes, K', and secured to the runners by rigid arms $K^2$. The shafts are operated by suitable handles, $K^3$, and would be held to their adjustment by any suitable means, and thus it will be seen that these runners can be thrown down or up in or out of contact with the ice, as desired. Figs. 10 and 11, which are sections on line 10 10, Fig. 9, show the construction of these runners and the way they are operated, the runner being in its upper position in Fig. 10, and in its lower position in Fig. 11.

$K^4$ represents boxes on the apparatus to receive tools, &c., or to stand in.

L represents handles for moving the apparatus endwise.

I claim as my invention—

1. The herein-described process of blocking ice, consisting in placing one or more cakes beneath the field of ice, and then cutting off the tiers thus made and allowing them to adhere together by freezing, for the purpose set forth.

2. The herein-described process of blocking ice, consisting in placing two or more cakes or pieces together while in the water and allowing them to adhere by freezing, substantially as and for the purpose set forth.

3. The herein-described process of blocking ice, consisting in placing one or more cakes beneath the field of ice, holding them in this position by suitable stakes, and then cutting off the tiers thus made and held together and allowing them to adhere together by freezing, as set forth.

4. In an apparatus for blocking ice, two or more runners, E', held together by suitable cross-pieces, and provided with handles $E^3$, notched blocks F, with spikes $F^2$, levers H, fulcrumed to the outer handles and engaging with notches on the inner handles, and having ropes G, with hooks G', secured to their outer ends, all substantially as shown and described.

5. In an apparatus for blocking ice, the supplemental runners pivoted beneath the main runners, for and substantially as set forth.

GEO. W. GOODELL.

In presence of—
   I. M. SPRING,
   THOS. H. CARTER.